April 21, 1942.  W. A. BALDWIN  2,280,615
BACK-UP VALVE
Filed June 13, 1941
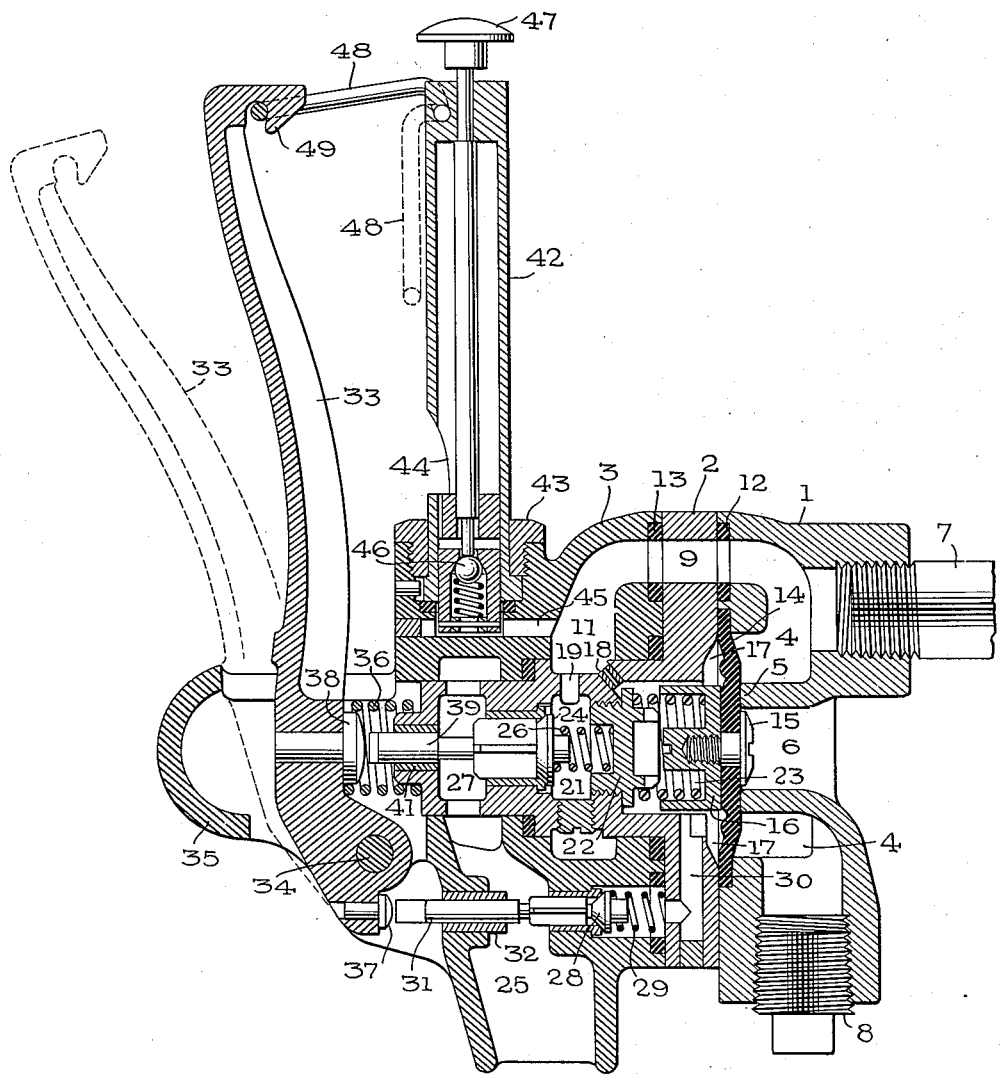
Inventor
Wayne A. Baldwin
By
Dodge and Sons
Attorneys Patented Apr. 21, 1942

2,280,615

UNITED STATES PATENT OFFICE 2,280,615

BACKUP VALVE

Wayne A. Baldwin, Watertown, N. Y., assignor to The New York Air Brake Company, a corporation of New Jersey Application June 13, 1941, Serial No. 397,970

3 Claims. (Cl. 303—51)

This invention relates to back-up valves for air brakes and provides a valve having a readily controlled service action and a dead man emergency action that does not impose an undue strain on the hands of the user.

Back-up valves having dead man emergency action have heretofore been proposed, but so far as I am advised they were either sluggish in emergency action, or required the user to exert undue force to hold the valve against dead man action.

According to the present invention, service reductions are provided by unseating a poppet valve of appropriate size. This gives good graduation and requires the exercise of no great force. Emergency venting is produced by a much larger valve which is controlled by a pilot poppet valve of small size. A single actuator is moved against moderate spring resistance to actuate the service valve. If released, this actuator unseats the pilot valve and causes the emergency valve to respond instantly to open a large capacity vent.

By adoption of the arrangement above outlined, the device is made easy to manipulate, refined control is secured, and the speed of emergency response is retained unimpaired.

A preferred embodiment of the invention will now be described by reference to the accompanying drawing in which the single view is an axial section through the complete device.

The valve mechanism is enclosed in a chambered housing made up of three parts, namely, a back or base section 1, an intermediate section 2, and a cap section 3. These three sections are connected by bolts which do not appear in the drawing. The section 2 has a central projecting hub portion which houses the service valve and is encircled by the cap section 3.

In the base section 1 is an annular chamber 4 which surrounds the valve seat 5 leading to the emergency vent passage 6. The device is connected to the brake pipe of the train by any suitable means typified by the nipple 7 to which the usual flexible hose (not shown) may be attached. There is an alternative threaded connection to the chamber 4 which is closed by the pipe plug 8. The plug 8 and the nipple 7 may be interchanged. The possibility of connecting the back-up valve in different ways permits its adaptation to the particular installation.

The chamber 4 communicates through a passage 9 in the hub section 2 with a chamber 11 in the cap section 3. Gaskets 12 and 13 ensure tight joints. The emergency vent valve which seats on the valve seat 5 takes the form of a flexible diaphragm 14 clamped and thus sealed at its periphery between the members 1 and 2. The diaphragm 14, when seated against seat 5, prevents flow from brake pipe chamber 4 to the emergency vent passage 6.

The center of the diaphragm 4 is connected by the screw 15 to a cup-shaped spring seat 16 which is mounted on the inner face of the diaphragm within a chamber 17 formed within the hub portion 2. The chamber 17 communicates with chamber 11 and consequently with the brake pipe chamber 4 by way of a flow restricting choke 18. The chamber 11 also communicates freely by a passage 19 with the chamber 21 which is isolated from the chamber 17 by a threaded plug 22 which also serves as a dual spring seat.

A coil compression spring 23 reacts between the spring seat 16 and the plug 22 to urge the emergency diaphragm valve 14 against the seat 5. It will be observed that the spring seat 16 engages the diaphragm 14 over the entire area of the seat 5 and thus assists in assuring a tight seal. The service poppet valve 24 closes in the direction of flow from the chamber 21 to the service exhaust passage 25 and is urged in a closing direction by a coil compression spring 26 which reacts between the valve 24 and the plug 22 already described.

It will be observed that the service exhaust passage 25 leads from the space 27 within the hub portion 2 to a shrouded passage formed in the cap portion 3. The service valve 24, which is of moderate size, controls discharge of air from the brake pipe; the flow being by way of chamber 4, passage 9, chamber 11, passage 19 past the valve 24 to the chamber 27 and then through the service exhaust passage 25.

The emergency valve 16 controls flow of brake pipe air directly from the chamber 4 to the emergency exhaust passage 6. The effect of the restricted choke 18 is to subject the entire inner area of diaphragm 14 to brake pipe air pressure. The air pressure is assisted by the load imposed by the coil compression spring 23. The outer side of the diaphragm 14 is subject to brake pipe pressure over the annular area outside the valve seat 5.

It follows that so long as brake pipe pressure is effective on the inner side of the diaphragm valve 14, the emergency vent valve will be held tightly closed. However, the load imposed by spring 23 alone is insufficient to hold the diaphragm 14 against the seat 5 in opposition to brake pipe pressure acting on the annular area of diaphragm 14 outside seat 5. Consequently, if the chamber 17 be completely vented, that is, vented at a rate greatly in excess of the flow capacity of the choke 18, the emergency vent valve will open wide.

To vent the chamber 17 use is made of a pilot poppet valve 28 which closes in the direction of flow from the chamber 17 to the service exhaust passage 25. This valve is lightly seated by a coil compression spring 29. The valve is mounted in the cap portion 3, as shown, and air reaches it from chamber 17 by way of passage 30 formed in intermediate portion 2 of the housing. The valve may be forced open through a thrust stem 31 which is distinct from the valve and which is guided in a bushing 32 fixed in the cap 3.

To actuate the service valve 24 and the pilot valve 28 selectively, use is made of an actuating lever 33 which is pivoted at 34 in a shroud 35 formed integrally with the cap 3. The shroud 35 limits the outward movement of the lever 33 under the urge of the coil compression spring 36 which is confined between the lever 33 and the end of the hub forming part of the section 2.

The lever 33 carries a hardened thrust button 37 which, when the lever moves outward to the dotted line position, forces the stem 31 inward and unseats the pilot valve 28. This entails an emergency reduction of brake pipe pressure.

The lever 33 carries on the other side of the fulcrum 34 a second hardened button 38 which, when the lever 33 is swung clockwise from the neutral position shown in full lines, engages a stem 39 which is in thrust relation with the service valve 24 and by displacing the stem 39 unseats this valve. The stem 39 is guided axialy in the hub of section 2 by a bushing 41, as shown.

In the preferred form of the device, the lever 33 forms the movable component of a compressible grip structure. The fixed component of the grip structure takes the form of a tubular handle 42 which is flanged at its lower end and locked in the cap section 3 by an encircling annular nut 43.

The handle 42 may also serve as a warning whistle, but no novelty is claimed here for that arrangement since it is the invention of another. The whistle notch is indicated at 44 and air to blow the whistle is taken from the chamber 11 by way of the passage 45 under the control of the ball check valve 46. This ball check valve may be unseated by depressing the thumb button 47 at the end of the grip 42.

Thus, the members 42 and 33 provide a compressible grip structure. With the member 33 in neutral position, as shown in full lines in the drawing, the service valve 24 is closed and the pilot valve 28 is closed. Consequently the emergency valve 14 is also closed.

If the lever 33 be drawn toward the grip member 42, the service valve 24 will be opened more or less and because of its rather small size will produce service reduction of brake pipe pressure which is readily controlled by the operator. If, however, the operator releases the handle 33, the spring 36 will force lever 33 outward (counter-clockwise as viewed in the drawing). This will unseat the poppet valve 28 and vent the chamber 17. The diaphragm valve 14 will be then open wide and produce an emergency reduction of brake pipe pressure.

Thus, the invention provides a readily portable device which permits manually controlled service applications, and provides for emergency reductions of the dead man type. Neither of these functions requires the exercise of more than moderate force on the part of the operator.

A bail 48 is hinged on the member 42 and may be swung up to engage a latch nose 49 on the end of the lever 33. This bail is used to hold the member 32 in neutral position while the back-up valve is being connected to the brake pipe. When the mechanism is in use the bail 48 is disengaged and swung to the dotted line position shown in the drawing. It is purposely located in a conspicuous position so that any attempt to carry it in the full line position shown in the drawing, while backing up a train, could readily be observed by inspectors.

The sectional construction of the housing has been described in some detail. As will be readily understood by persons skilled in the valve art, certain of these details were adopted to facilitate assembly. As the device is portable, lightness is a valuable feature. It can, if desired, be constructed of aluminum castings. The contemplated use of this comparatively soft metal is one reason for the use of bushings such as 32 and 41 and the hardened inserts 37 and 38.

The detailed description as above given is intended to be illustrative and not limiting, the scope of the invention being defined solely by the claims.

I claim:

1. In a back-up valve for automatic brake systems, the combination of a portable housing having a hand grip and means for attachment of the housing to a brake pipe; a normally closed service valve controlling flow therefrom; an emergency vent valve mechanism also controlling flow from said housing mounted thereon and comprising a normally inactive pilot valve, a large capacity vent valve, and pressure actuated biasing means for the vent valve controlled by the pilot valve, the parts being so arranged that actuation of the pilot valve serves to convert a normal closing bias exerted on the vent valve into an opening bias; an actuator carried by said housing and shiftable in reverse directions toward and from the hand grip to actuate selectively said service valve and said pilot valve; and yielding means urging said actuator in a direction to actuate said pilot valve.

2. In a back-up valve for automatic brake systems, the combination of a portable housing having a hand grip and means for attachment of the housing to a brake pipe; a normally closed service poppet valve controlling flow threfrom; an emergency vent valve mechanism also controlling flow from said housing and comprising a normally closed poppet pilot valve, a large capacity vent valve, and pressure actuated biasing means for the vent valve controlled by the pilot valve, the parts being so arranged that opening of the pilot valve serves to convert a normal closing bias exerted on the vent valve into an opening bias; an actuator hinged to swing in reverse directions toward and from said hand grip to unseat selectively said service valve and said pilot valve; and yielding means urging said actuator away from said hand grip and in a direction to unseat said pilot valve.

3. In a back-up valve for automatic brake systems, the combination of a portable chambered housing having a hand grip and means for attachment of the housing to a brake pipe; a poppet valve for controlling flow of brake pipe air from said housing at a service rate, said valve closing in the direction of outflow; an emergency vent valve mechanism comprising a large capacity vent valve also controlling flow of brake pipe air from said housing, an actuating abutment for the vent valve dividing a chamber within said housing into two working spaces in the first of which brake pipe pressure exerts an opening tendency and in the second of which it exerts a closing tendency on the vent valve, means affording restricted communication between said working spaces, means biasing said valve in a closing direction with a force less than the opening tendency exerted by brake pipe pressure, and a pilot poppet valve closing in the direction of flow from the second working space and controlling such flow; an actuator hinged to swing from a neutral position in opposite directions toward and from said hand grip to unseat selectively said service valve and said pilot valve; means urging said actuator away from said hand grip in the direction to unseat said pilot valve; and a latch for temporarily retaining the actuator in its neutral position.

WAYNE A. BALDWIN.